Patented June 24, 1930

1,765,687

UNITED STATES PATENT OFFICE

FRITZ MAYER AND KARL ZAHN, OF FRANKFORT-ON-THE-MAIN, GERMANY, ASSIGNORS TO GENERAL ANILINE WORKS, INC., OF NEW YORK, N. Y., A CORPORATION OF DELAWARE

SULPHUR-CONTAINING HYDROXYQUINONES AND PROCESS OF PREPARING THEM

No Drawing. Application filed August 11, 1928, Serial No. 299,111, and in Germany September 7, 1927.

The present invention relates to new sulphur-containing hydroxyquinones and to a process of preparing the same.

We have found that hydroxylated thiophanthrenequinones are obtained by subjecting a thiophen-2.3-dicarboxylic acid or the anhydride thereof of the general formula:

wherein R stands for an aromatic residue of the benzene-, naphthalene- or anthracene series which may be substituted in any manner together with a compound of the general formula:

HO-aryl-OH which may be substituted in any manner, but contains two hydrogen atoms in ortho position to each other to the action of a metal chloride of condensing property at a temperature exceeding 100° C., preferable one between 150° C. to 250° C. The reaction takes place according to the following equation, in which for instance there have been chosen as components the anhydride of thionaphthene-2.3-dicarboxylic acid and hydroquinone.

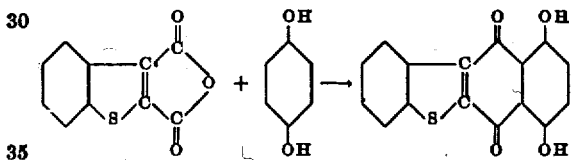

It is a surprising fact that according to this reaction it is possible by a single operation and without there being any substantial decomposition of the heterocyclic o-dicarboxylic acids, to obtain in a direct way the quinone bodies. The new compounds of the following general formula:

wherein R stands for an aromatic residue of the benzene, naphthalene, or anthracene series and wherein $C_1$ and $C_2$ represent carbon atoms belonging to a dihydroxylated aryl nucleus which may be further substituted, are valuable starting materials for the manufacture of dyestuffs.

The following examples serve to illustrate our invention but they are not intended to limit it thereto, the parts being parts by weight.

1. A mixture of 10 parts of thionaphthene-2, 3-dicarboxylic acid anhydride of the formula:

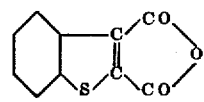

and 40 parts of hydroquinone is introduced at 180° C. into a melt of 10 parts of sodium chloride and 50 parts of aluminium chloride, while stirring, the temperature is then raised to 190° C. and kept so for 5 hours. The mass is then mixed with some ice and hydrochloric acid and worked up. The resulting 1.4-dihydroxy-benzothiophanthrenequinone:

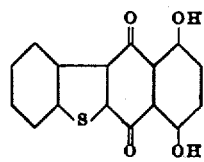

can be purified by way of its diacetyl compound or by recrystallization from pyridine. It forms red laminæ melting at 253-254° C.

2. If the thionaphthene-2.3-dicarboxylic acid anhydride, as used in example 1, is replaced by 5-chlor-7-methylthionaphthene-2.3-dicarboxylic acid anhydride of the formula:

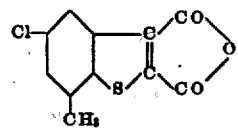

there is obtained 1.4-dihydroxy-6-methyl-8- chlor-benzothiophanthrenequinone of the following constitution:

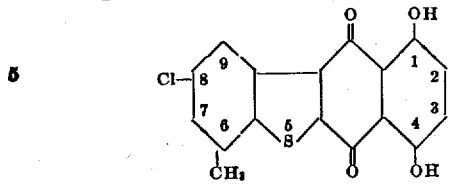

This compound melts at 291°–292° C. and crystallizes in feather-like needles.

3. If the hydroquinone as used in example 1 is replaced by hydroxy-hydroquinone, a product melting at 241° C. to 242° C. is obtained which evidently constitutes a trihydroxybenzothiophanthrenequinone.

Instead of the thionaphthene-2.3-dicarboxylic acids as employed in the foregoing examples there may be used benzothiophene-2.3-dicarboxylic acids with other substituents in the benzene nucleus, and also thiophene-2.3-dicarboxylic acids of the naphthalene- and anthracene series and their substitution products.

As condensing agents may be employed, besides the mixture of sodium chloride and aluminium chloride used in the preceding examples, for instance aluminium chloride alone or mixed with ferric chloride, or a mixture of sodium-iron-aluminium chloride, or another mixture of metal chlorides capable of acting as a condensing agent.

We claim:

1. The process which consists in causing a compound of the general formula:

HO-aryl-OH which may be substituted in any manner, but contains two hydrogen atoms in ortho position to each other, to act upon a thionaphthene-2.3-dicarboxylic acid anhydride of the general formula:

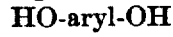

wherein R stands for an aromatic residue of the benzene-, naphthalene- or anthracene series which may be substituted in any manner, in the presence of a metal chloride capable of acting as a condensing agent and at a temperature exceeding 100° C.

2. The process which consists in causing a compound of the general formula:

HO-aryl-OH which may be substituted in any manner, but contains two hydrogen atoms in ortho position to each other, to act upon a thionaphthene-2.3-dicarboxylic acid anhydride of the general formula:

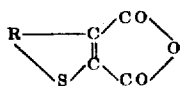

wherein R stands for an aromatic residue of the benzene-, naphthalene- or anthracene series which may be substituted in any manner, in the presence of aluminium chloride at a temperature exceeding 100° C.

3. The process which consists in causing a compound of the general formula:

HO-aryl-OH which may be substituted in any manner, but contains two hydrogen atoms in ortho position to each other, to act upon a thionaphthene-2.3-dicarboxylic acid anhydride of the general formula:

wherein R stands for an aromatic residue of the benzene-, naphthalene- or anthracene series which may be substituted in any manner, in the presence of molten sodium-aluminium chloride at a temperature between 150° C. to 250° C.

4. The process which consists in causing a compound of the general formula:

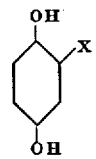

wherein X stands for hydrogen or the OH group, to act upon a thionaphthene-2.3-dicarboxylic acid anhydride of the general formula:

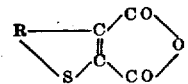

wherein R stands for an aromatic residue of the benzene-, naphthalene- or anthracene series which may be substituted in any manner, in the presence of a metal chloride capable of acting as a condensing agent and at a temperature exceeding 100° C.

5. The process which consists in causing hydroquinone to act upon a thionaphthene-2.3-dicarboxylic acid anhydride of the general formula:

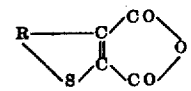

wherein R stands for an aromatic residue of the benzene-, naphthalene- or anthracene series which may be substituted in any manner, in the presence of a metal chloride capable of acting as a condensing agent and at a temperature exceeding 100° C.

6. The process which consists in causing a compound of the general formula:

HO-aryl-OH which may be substituted in any manner, but contains two hydrogen atoms in ortho position to each other, to act upon a thionaphthene-2.3-dicarboxylic acid anhydride of the general formula:

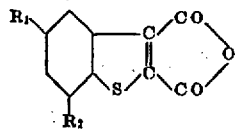

wherein $R_1$ stands for hydrogen or a halogen, and $R_2$ for H or an alkyl, in the presence of a metal chloride capable of acting as a condensing agent and at a temperature exceeding 100° C.

7. The process which consists in causing a compound of the general formula:

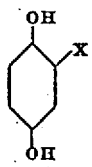

wherein X stands for hydrogen or the OH group, to act upon a thionaphthene-2.3-dicarboxylic acid anhydride of the general formula:

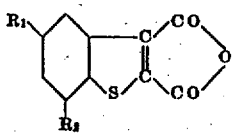

wherein $R_1$ stands for hydrogen or a halogen, and $R_2$ for hydrogen or an alkyl, in the presence of molten sodium-aluminium chloride at a temperature between 150° C. and 250° C.

8. The process which consists in causing hydroquinone to act upon a thionaphthene-2.3-dicarboxylic acid anhydride of the general formula:

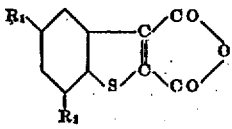

wherein $R_1$ stands for hydrogen or a halogen, and $R_2$ for hydrogen or an alkyl, in the presence of molten sodium-aluminium chloride at a temperature between 150° C. and 250° C.

9. The process which consists in causing a compound of the general formula:

HO-aryl-OH which may be substituted in any manner but contains two hydrogen atoms in ortho position to each other, to act upon thionaphthene-2.3-dicarboxylic acid anhydride in the presence of a metal chloride capable of acting as a condensing agent and at a temperature exceeding 100° C.

10. The process which consists in causing a compound of the general formula:

wherein X stands for hydrogen or the OH group, to act upon thionaphthene-2.3-dicarboxylic acid anhydride in the presence of molten sodium-aluminium chloride at a temperature between 150° C. and 250° C.

11. The process which consists in causing hydroquinone to act upon thionaphthene-2.3-dicarboxlylic acid anhydride in the presence of molten sodium-aluminium chloride at a temperature between 150° C. and 250° C.

12. As new products, sulphur-containing hydroxyquinones of the following general formula:

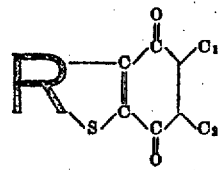

wherein R stands for an aromatic residue of the benzene, naphthalene, or anthracene series and wherein $C_1$ and $C_2$ represent carbon atoms belonging to a dihydroxylated aryl nucleus which may be further substituted.

13. As new products, sulphur-containing hydroxyquinones of the following general formula:

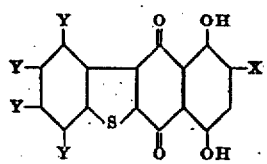

wherein X stands for hydrogen or hydroxyl, Y for hydrogen, alkyl, halogen or hydroxyl, or 2 Y's in ortho position to each other stand for an arylene residue linked on.

14. As new products, sulphur-containing hydroxyquinones of the following general formula:

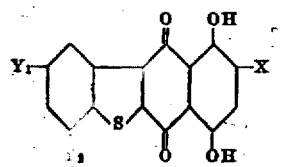

wherein X stands for hydrogen or hydroxyl, $Y_1$ for hydrogen or halogen and $Y_2$ for hydrogen or alkyl.

15. As new products, sulphur-containing hydroxyquinones of the following general formula:

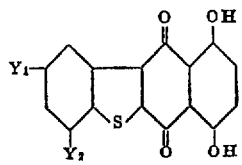

wherein $Y_1$ stands for hydrogen or halogen and $Y_2$ for hydrogen or alkyl.

16. As a new product, 1.4-dihydroxy-benzothiophanthrene-quinone of the following formula:

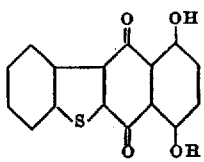

which, after recrystallization from pyridine, forms red crystals melting at 253° C. to 254° C.

In testimony whereof, we affix our signatures.

FRITZ MAYER.
KARL ZAHN.

Certificate of Correction

Patent No. 1,765,687. Granted June 24, 1930, to

FRITZ MAYER ET AL.

It is hereby certified that error appears in the printed specification of the above numbered patent requiring correction as follows:
Page 1, lines 45 to 49, strike out the formula and insert instead

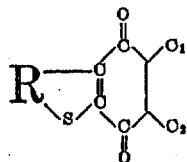

page 2, line 66, for the misspelled word "beneze-" read *benzene-;* and that the said Letters Patent should be read with these corrections therein that the same may conform to the record of the case in the Patent Office.
Signed and sealed this 2d day of September, A. D. 1930.

[SEAL.]

M. J. MOORE,
*Acting Commissioner of Patents.* hydroxyquinones of the following general formula:

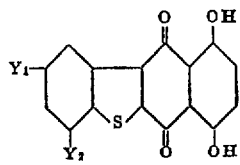

wherein $Y_1$ stands for hydrogen or halogen and $Y_2$ for hydrogen or alkyl.

16. As a new product, 1.4-dihydroxy-benzothiophanthrene-quinone of the following formula:

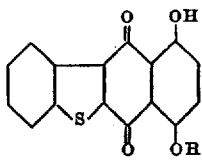

which, after recrystallization from pyridine, forms red crystals melting at 253° C. to 254° C.

In testimony whereof, we affix our signatures.

FRITZ MAYER.
KARL ZAHN.

Certificate of Correction

Patent No. 1,765,687. Granted June 24, 1930, to

FRITZ MAYER ET AL.

It is hereby certified that error appears in the printed specification of the above numbered patent requiring correction as follows:
Page 1, lines 45 to 49, strike out the formula and insert instead

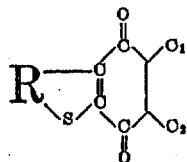

page 2, line 66, for the misspelled word "beneze-" read *benzene-*; and that the said Letters Patent should be read with these corrections therein that the same may conform to the record of the case in the Patent Office.

Signed and sealed this 2d day of September, A. D. 1930.

[SEAL.]

M. J. MOORE,
*Acting Commissioner of Patents.*